Nov. 25, 1947.    F. E. BACHMAN ET AL    2,431,302
AIRCRAFT LANDING GEAR
Filed July 22, 1944    2 Sheets-Sheet 1

INVENTORS.
Fred E. Bachman
and Lawrence Gothberg

Nov. 25, 1947.  F. E. BACHMAN ET AL  2,431,302
AIRCRAFT LANDING GEAR
Filed July 22, 1944  2 Sheets-Sheet 2
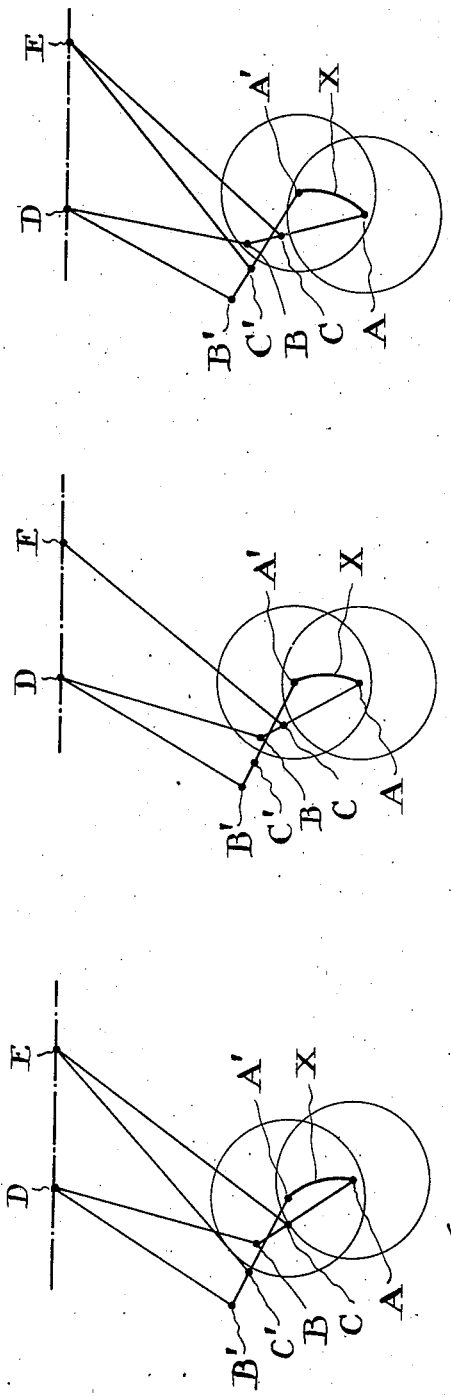
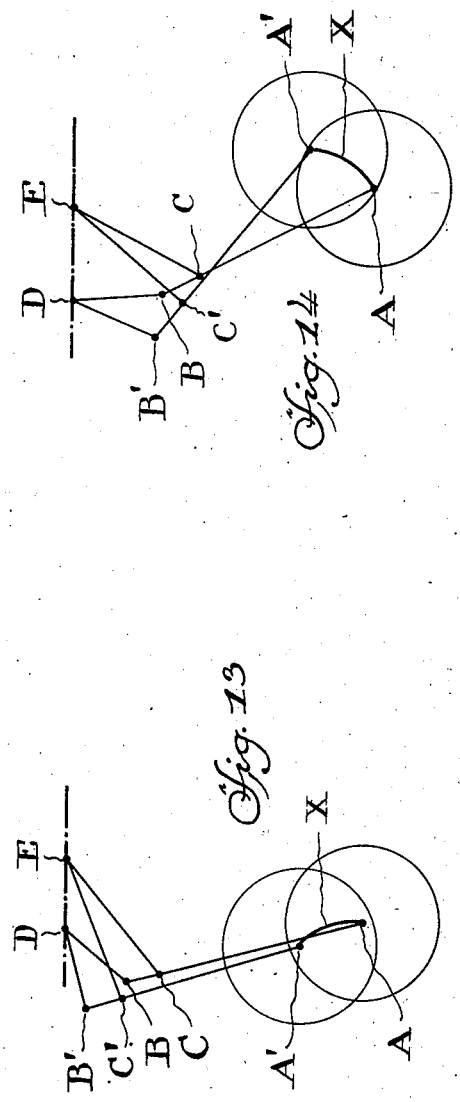
INVENTORS.
Fred E. Bachman
and Lawrence Gothberg Patented Nov. 25, 1947

2,431,302

UNITED STATES PATENT OFFICE 2,431,302

AIRCRAFT LANDING GEAR

Fred E. Bachman and Lawrence Gothberg, Chicago, Ill., assignors to American Steel Foundries, Chicago, Ill., a corporation of New Jersey Application July 22, 1944, Serial No. 546,092

6 Claims. (Cl. 244—104)

Our invention relates to landing gear for aircraft and more particularly to a mechanism incorporating a shock absorber device for dampening compression and extension of the gear during landing of the associated aircraft.

Our novel gear is of the levered type, wherein horizontal as well as vertical shocks are absorbed or dampened and wherein shimmying of the wheel is substantially eliminated by a caster arrangement or, in other words, an arrangement in which the wheel is dragged rather than pushed over the terrain by the landing gear.

The general object of our invention is to devise a landing gear of the above described type wherein a plurality of interconnected links or levers between the aircraft and the wheel provide for relative fore or aft, as well as vertical movement of the latter with respect to the aircraft, the shock absorber device being connected to the gear in such manner as to afford actuation of said device during compression of the landing gear as a result of horizontal or vertical shocks imposed thereon.

Our novel gear is so designed as to comprise an inherent flexibility, whereby any desired movement of the wheel relative to the aircraft during a landing operation may be obtained by properly proportioning and interconnecting the various elements of the gear.

In the drawings,

Figures 10 to 14 are diagrams illustrating the inherent flexibility in our novel design of landing gear.

Figure 1:
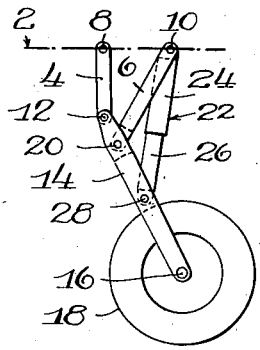
Figures 1 to 3 are side elevations illustrating the preferred embodiment of our novel landing gear in its fully extended position, its static position, and its fully compressed position, respectively.
Figure 2:
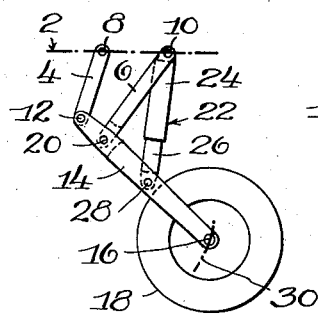
Figure 3:
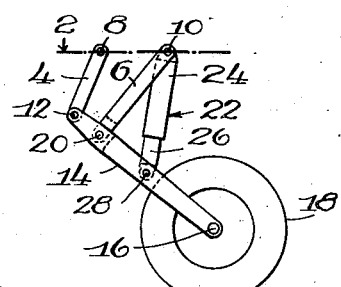

Describing our invention in detail and referring first to the embodiment thereof shown in Figures 1 to 3, the aircraft is diagrammatically illustrated at 2 and spaced links or levers 4 and 6 are pivoted thereto as at 8 and 10, respectively. The link 4 is pivoted at 12 to one end of a link or lever 14, which is pivoted at its opposite end as at 16 to the axle (not shown) of the wheel 18. The link 6 is pivoted at 20 to the lever 14 intermediate its ends.

The shock absorber device generally designated 22 comprises a cylinder 24 pivoted to the aircraft 2 at the pivot point 10, and said device comprises a piston 26 pivoted at 28 to the lever 14, said device comprising any desired conventional means (not shown) for metering hydraulic fluid, such as oil, within the cylinder 24 on the closure and extension stroke of the device.

The path of the wheel in its movement relative to the aircraft during compression of the gear is illustrated by the line 30, which clearly shows that the initial movement of the wheel is aft or rearwardly of the craft, thus decreasing the rotational movement of the wheel relative to the terrain as the wheel engages the latter during a landing operation. After the initial aft movement of the wheel relative to the aircraft, subsequent movement is vertical as indicated by the line 30, thus cushioning the vertical load due to the weight of the craft.

Figure 4:
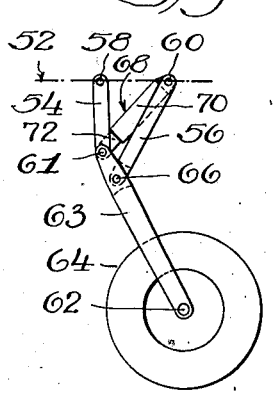
Figures 4 to 6 illustrate a modification of our invention and are generally comparable to Figures 1 to 3, respectively.
Figure 5:
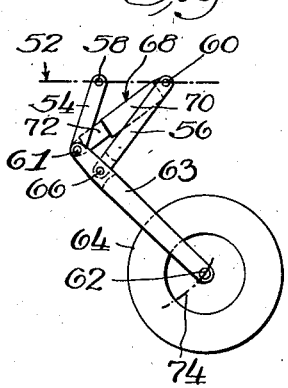
Figure 6:
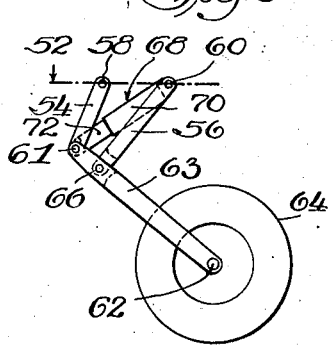

Referring now to Figures 4 to 6, which illustrate a modification of our invention, the craft is indicated at 52 and the spaced links or levers 54 and 56 are pivoted thereto as at 58 and 60, respectively. The link 54 is pivoted at 61 to the upper end of the link or lever 63, the lower end of which is pivoted at 62 to the axle (not shown) of the wheel 64. The link 56 is pivoted at 66 to the lever 60 intermediate its ends.

The shock absorber device generally designated 68 comprises a cylinder 70 pivoted to the aircraft 52 at the pivot point 60, and said device comprises a piston 72 pivoted to the lever 60 at the pivot point 61. The path of the wheel 64 in its movement relative to the aircraft during compression and extension of the gear is indicated by the line 74 (Figure 5), which shows that said movement is substantially in an aft or rearward direction.

It may be noted that in the embodiment of my invention illustrated in Figures 4 to 6, the shock absorber device 68 is extended or placed in tension during compression of the gear, whereas in the embodiment illustrated in Figures 1 to 3, the shock absorber device 22 is closed or compressed during compression of the gear.

Figure 7:
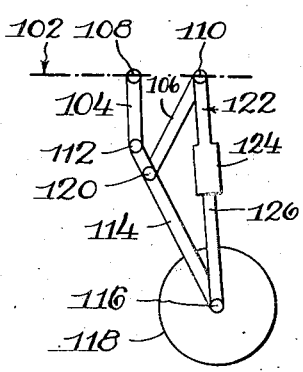
Figures 7 to 9 illustrate another modification of our invention and are generally comparable to Figures 1 to 3, respectively.
Figure 8:
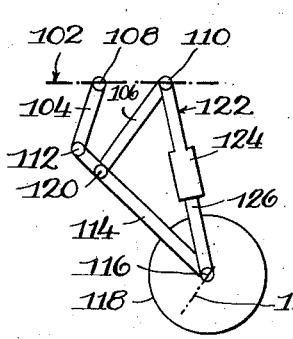
Figure 9:
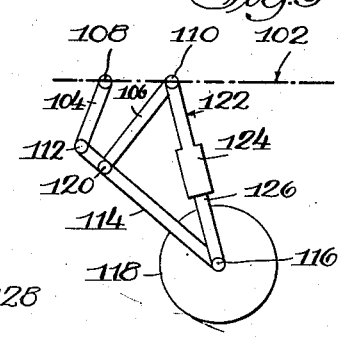

Referring now to Figures 7 to 9, which illustrate another modification of our invention, the aircraft is diagrammatically indicated at 102 and the spaced links or levers 104 and 106 are pivoted thereto as at 108 and 110, respectively, the link 104 being pivoted at 112 to the upper end of the link or lever 114, the lower end of which is pivoted at 116 to the axle (not shown) of the wheel 118. The link 106 is pivoted at 120 to the lever 114 intermediate its ends.

The shock absorber device, generally designated 122, comprises a cylinder 124 pivoted to the aircraft 102 at the point 110 and a piston 126 pivoted to the axle of the wheel at the point 116. The path of the wheel 118 relative to the aircraft during compression of the gear, is indicated by the line 128.

Figures 10 to 14 are diagrams illustrating the inherent flexibility in our novel design of landing gear, in that any desired wheel movement relative to the aircraft during a landing operation may be obtained by varying the proportions of the various elements of the gear.

In each of these figures, the wheel axis is indicated at A in the fully extended position of the gear, and the pivotal connections between the links and the levers are designated B and C, respectively. The shock absorber device is omitted in these diagrams, inasmuch as the purpose thereof is to illustrate the movement of the wheel relative to the aircraft as the landing gear is compressed and extended.

In the fully compressed position of the gear in each of Figures 10 to 14, the wheel axis is designated A' and the pivotal connections between the links and the lever are designated, respectively, B' and C'. The pivotal connection between the links and the aircraft are indicated at D and E in each of these figures, and the path of the wheel relative to the aircraft as the gear is compressed and extended is indicated at X.

Thus, in Figure 10, movement of the wheel relative to the aircraft is in a substantially forward direction, and in Figure 11, said movement is in substantially a vertical direction.

Figure 12 illustrates a highly desirable condition somewhat similar to that shown in the preferred embodiment of Figures 1 and 3, wherein the movement of the wheel relative to the aircraft is initially in an aft or rearward direction and is subsequently substantially vertical.

Figure 13 illustrates an arrangement in which the initial movement of the wheel relative to the aircraft is substantially vertical and the subsequent movement thereof is in a forward direction, and Figure 14 illustrates an arrangement in which movement of the wheel relative to the aircraft is in a substantially aft or rearward direction.

Thus, it will be understood by a comparison of Figures 10 to 14, that by proportioning the dimensions of the various elements of our novel landing gear and by suitably altering the pivotal interconnections between said elements, any desired movement of the wheel relative to the aircraft during compression and extension of the gear may be obtained.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. In a landing gear for aircraft, a wheel and axle assembly, a diagonal lever pivotally connected thereto and sloping upwardly and forwardly therefrom, a pair of links pivotally connected at spaced points to said aircraft and at different spaced points to said lever, one of said first-mentioned spaced points being disposed forwardly of the other, both of said different spaced points being disposed forwardly and upwardly with respect to the connection of said lever to said assembly, and shock absorber means for yieldingly resisting compression of said gear.

2. In a landing gear for aircraft, a wheel and axle assembly, a diagonal rigid member pivotally connected thereto and sloping upwardly and forwardly therefrom, a forward link and a rear link pivotally connected to said member at spaced points thereon disposed upwardly and forwardly of said assembly, said links being adapted for pivotal connection to said craft at spaced points lying in a common substantially horizontal plane, and means for resisting compression of said gear.

3. In a landing gear for aircraft, a wheel and axle assembly, a diagonal rigid member pivotally connected thereto and sloping upwardly and forwardly therefrom, a forward link and a rear link pivotally connected to said member at spaced points thereon disposed upwardly and forwardly of said assembly, said links being adapted for pivotal connection to said craft at spaced points lying in a common substantially horizontal plane, and means for resisting compression of said gear, said means comprising a shock absorber device connected to said member and to one of said links.

4. In a landing gear for aircraft, a wheel and axle assembly, a diagonal rigid member pivotally connected thereto and sloping upwardly and forwardly therefrom, a forward link and a rear link pivotally connected to said member at spaced points thereon disposed upwardly and forwardly of said assembly, said links being adapted for pivotal connection to said craft at spaced points lying in a common substantially horizontal plane, and means for resisting compression of said gear, said means comprising a tension shock absorber device connected to the upper end of said member and to said rear link.

5. In a landing gear for aircraft, a wheel and axle assembly, a diagonal rigid member pivotally connected thereto and sloping upwardly and forwardly therefrom, a forward link and a rear link pivotally connected to said member at spaced points thereon disposed upwardly and forwardly of said assembly, said links being adapted for pivotal connection to said craft at spaced points lying in a common substantially horizontal plane, and means for resisting compression of said gear, said means comprising a shock absorber device connected to the rear link and to said member beneath the connection of said rear link thereto.

6. In a landing gear for aircraft, a wheel and axle assembly, a diagonal rigid member pivotally connected thereto and sloping upwardly and forwardly therefrom, a forward link and a rear link pivotally connected to said member at spaced points thereon disposed upwardly and forwardly of said assembly, said links being adapted for pivotal connection to said craft at spaced points lying in a common substantially horizontal plane, and means connected between said member and said aircraft for resisting compression of said gear.

FRED E. BACHMAN.
LAWRENCE GOTHBERG.

REFERENCES CITED

The following references are of record in the file of this patent:

UNITED STATES PATENTS

| Number | Name | Date |
|---|---|---|
| 2,015,920 | Canney | Oct. 1, 1935 |
| 2,338,046 | Lloyd | Dec. 28, 1943 |
| 1,084,777 | Wyckoff | Jan. 20, 1914 |

FOREIGN PATENTS

| Number | Country | Date |
|---|---|---|
| 506,719 | Great Britain | May 30, 1939 |
| 526,116 | Great Britain | Sept. 11, 1942 |
| 433,722 | France | Nov. 3, 1911 |